(12) United States Patent
Jennings

(10) Patent No.: US 7,264,074 B2
(45) Date of Patent: Sep. 4, 2007

(54) AFTER-MARKET DASHBOARD BEZEL FOR AN AUTOMOBILE HAVING A NUMBER OF INSTRUMENT HOLDERS AND ASSOCIATED METHOD

(76) Inventor: Douglas M. Jennings, 10780 Affirmed Dr., Indianapolis, IN (US) 46234

( * ) Notice: Subject to any disclaimer, the term of this patent is extended or adjusted under 35 U.S.C. 154(b) by 727 days.

(21) Appl. No.: 09/696,458

(22) Filed: Oct. 25, 2000

(65) Prior Publication Data
US 2004/0056502 A1 Mar. 25, 2004

Related U.S. Application Data

(60) Provisional application No. 60/207,584, filed on May 26, 2000.

(51) Int. Cl.
*B60K 37/04* (2006.01)
(52) U.S. Cl. .......................... 180/90; 296/70
(58) Field of Classification Search .................. 180/90; 296/70; 362/487–489
See application file for complete search history.

(56) References Cited

U.S. PATENT DOCUMENTS

| | | |
|---|---|---|
| D64,038 S | 2/1924 | Whittington |
| D73,915 S | 11/1927 | Jacobi |
| D99,975 S | 6/1936 | Heller |
| D182,214 S | 2/1958 | Wilfert |
| D266,410 S | 10/1982 | Hoese |
| D276,903 S | 12/1984 | Hoese |
| D288,430 S | 2/1987 | Cornwell |
| 5,324,203 A * | 6/1994 | Sano et al. ..................... 439/34 |
| 5,685,595 A * | 11/1997 | Nishijima et al. ............ 296/70 |
| 5,823,602 A * | 10/1998 | Kelman et al. ............... 296/70 |
| 5,857,726 A * | 1/1999 | Yokoyama et al. ........... 296/70 |
| D410,608 S | 6/1999 | Kraus |
| 5,979,965 A * | 11/1999 | Nishijima et al. ............ 296/70 |
| 5,997,161 A * | 12/1999 | Stringfellow et al. ....... 362/489 |
| 6,048,020 A * | 4/2000 | Gronowicz et al. ........... 296/70 |
| 6,179,429 B1 * | 1/2001 | Sheldon et al. ............... 362/26 |
| D440,925 S | 4/2001 | Pfeiffer |
| D467,845 S | 12/2002 | Pfeiffer et al. |
| D471,141 S | 3/2003 | Hofmann et al. |

OTHER PUBLICATIONS 2 pages—one page of supplemental catalog by Auto Meter Competition Instruments, publication date Oct. 24, 2000 on lower right corner, and cover page of this catalog ("New Products for 2001").*
1 page—p. 17 of main 2001 catalog by Auto Meter Competition Instruments.*

(Continued)

*Primary Examiner*—Lesley D. Morris
(74) *Attorney, Agent, or Firm*—Maginot, Moore & Beck

(57) ABSTRACT

An instrument bezel for an automobile facilitates the addition of supplemental instruments to a vehicle while maintaining a clear and unobstructed view of the road for the driver without placing the supplemental instruments in a location that would make reading these instruments awkward and unsafe. The present instrument bezel is shaped to surround the dashboard of the automobile and replace an original instrument panel or dashboard bezel of the automobile. In one embodiment, the present instrument bezel includes integral pods or mounts on the bottom corners for retaining the supplemental instruments. The present instrument bezel may be made of fiberglass, carbon fiber, plastic, metal, or the like.

29 Claims, 12 Drawing Sheets

OTHER PUBLICATIONS

Auto Meter Products, Inc., product flyer for gauge bezels for Honda, Acura and Ford—"New for '99" (2 copies).*

"Auto Meter Competition Instruments Catalog", Auto Meter Products, Inc. © 1998, published at least as early as May 25, 2000, pp. 1-3, 9, 11-21.

"Auto Meter Competition Instruments Catalog Supplement", Auto Meter Products, Inc. © 1999, published at least as early as May 25, 2000, pp. 1-2, 33, 88-91.

Page 69 of the Aug. 2000 edition of *Import Tuner* magazine showing a picture of a dashboard bezel of Auto Meter Products, Inc. that is configured to house two gauges.

Pages 69 and 54 of the Aug. 2000 edition of *Import Tuner* magazine, with p. 69 showing a picture of a dashboard bezel of Auto Meter Products, Inc. that is configured to house two gauges.

Page 122 of the Jul. 2000 edition of *Turbo* magazine (vol. 16, No. 7) showing a picture of a "trick gauge pod" from Auto Meter Products, Inc. and stating "Auto Meter had a trick gauge pod for '94 -and-up Integras that houses two gauges in the corners of the instrument panel."

Mitsubishi Parts document showing factory part No. 81101; published at least as early as Nov. 1999; two (2) pages (hereinafter "the Mitsubishi Parts reference").

Twenty-six (26) colored copies of a 2000 catalog showing a Mitsubishi Eclipse automobile; published at least as early as Nov. 1999 (hereinafter "the 2000 Mitsubishi Catalog reference").

* cited by examiner

AFTER-MARKET DASHBOARD BEZEL FOR AN AUTOMOBILE HAVING A NUMBER OF INSTRUMENT HOLDERS AND ASSOCIATED METHOD

This non-provisional U.S. patent application claims the benefit of U.S. provisional patent application Ser. No. 60/207,584 filed on May 26, 2000.

TECHNICAL FIELD OF THE INVENTION

The present invention relates to a bezel for an automobile and, more particularly, to an after-market dashboard bezel for an automobile for mounting supplemental instruments or gauges.

BACKGROUND OF THE INVENTION

Many automobile drivers either choose or require more or additional information about the status of their vehicle's engine than is made available by the manufacturer of the vehicle. This may be especially true for owners of what are termed custom vehicles or vehicles in which the engines have been modified. As well, drivers of vehicles involved in racing and other similar activities may have a critical need for more information regarding the status of their vehicle's engine.

An engine has many measurable properties that may be monitored. Often, it is very important for a driver to monitor revolutions per minute (RPMs) of an engine, the amount of oil and its pressure in the engine, the air and fuel mixture ratio in the engine, as well as the water temperature. Additional measurable properties include voltage, engine temperature, quantity of fuel and other consumable liquids, and the like. However, most car manufacturers do not choose to make the instruments or gauges necessary for such measurements available from the factory, or provide "idiot lights" in place thereof to warn the owner only after a problem has occurred.

Thus, owners are forced to add the instruments or gauges to their vehicles on their own. Since the vehicles have not been designed to accommodate the additional instruments, the resulting addition of instruments can be unsightly as well as posing a potential safety risk. Some instrument clusters or gauge pods, designed for additional instruments, such as the A-Pillar instrument pods, can obstruct the driver's view of the road, while other gauge pods are positioned such that constant monitoring of these instruments can significantly distract the driver from the road.

It is thus an object of the present invention to provide a manner of mounting supplemental instruments in a vehicle that alleviates the above problems.

SUMMARY OF THE INVENTION

The present invention is a method, apparatus, and/or article of manufacture that facilitates the addition of supplemental instruments to a vehicle. The present invention provides the capability of adding supplemental instruments to a vehicle without placing the instruments in a location that would make reading these instruments awkward and/or unsafe.

In accordance with one embodiment of the present invention, there is provided an instrument bezel for a vehicle. The instrument bezel includes a body configured to surround a window of an instrument cluster assembly of the vehicle. The instrument bezel also includes an instrument mount secured to the body.

In accordance with another embodiment of the present invention, there is provided an after-market instrument bezel adapted to replace an original dashboard bezel surrounding a window of an instrument cluster assembly of a vehicle. The after-market instrument bezel includes a body substantially conforming in dimension to the original dashboard bezel. The after-market instrument bezel also includes an instrument mount secured to the body.

In accordance with yet another embodiment of the present invention, there is provided a method of adding an additional instrument to a vehicle. The method includes the step of removing an original dashboard bezel from the vehicle so as to expose a bezel mounting space. The method also includes the step of installing an instrument bezel in the bezel mounting space. The instrument bezel has a body which substantially conforms in dimension to the original dashboard bezel. The instrument bezel also includes an instrument mount secured to the body. The instrument mount is adapted to retain the additional instrument.

In accordance with a further embodiment of the present invention, there is provided a kit for mounting a supplemental instrument in a vehicle. The kit includes an instrument bezel having (i) a body substantially conforming in dimension to an original dashboard bezel of the vehicle, and (ii) an instrument mount secured to the body. The instrument mount is adapted to retain the additional instrument. The kit also includes a number of printed instructions for installing the instrument bezel in the vehicle.

In accordance with another embodiment of the present invention, there is provided a method of adding an additional instrument to a vehicle. The method includes the step of removing a first dashboard bezel from the vehicle such that the first dashboard bezel is spaced apart from a window of an instrument cluster assembly associated with the vehicle. The method also includes the step of securing a second dashboard bezel to the vehicle such that the second dashboard bezel is positioned proximate to the window of the instrument cluster assembly. The second dashboard bezel has (i) a body substantially conforming in dimension to the first dashboard bezel, and (ii) an instrument mount secured to the body. The instrument mount is adapted to retain the additional instrument.

In accordance with yet another embodiment of the present invention, there is provided a dashboard assembly for a vehicle. The dashboard assembly includes an instrument cluster assembly having a first instrument and a window through which the first instrument is visible to a driver of the vehicle. The dashboard assembly also includes a bezel having a body which defines a viewing opening. The bezel is mounted in relation to the instrument cluster assembly such that the first instrument is visible to the driver of the vehicle through the viewing opening. The bezel also has an instrument mount secured to the body of the bezel.

It is therefore an object of the present invention to provide a new and useful replacement dashboard bezel.

It is moreover an object of the present invention to provide an improved replacement dashboard bezel.

It is also an object of the present invention to provide a new and useful method for adding an instrument to an automobile.

It is moreover an object of the present invention to provide an improved method for adding an instrument to an automobile.

It is yet another object of the present invention to provide a replacement dashboard bezel which allows an instrument to be added to an automobile in a manner which is more aesthetically pleasing relative to heretofore designed mounting mechanisms and methods.

It is also an object of the present invention to provide a replacement dashboard bezel which allows after-market instruments to be added to the automobile without obstructing the driver's view of the road.

The above and other objects, features, and advantages of the present invention will become apparent from the following description and the attached drawings.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views.

DETAILED DESCRIPTION OF THE INVENTION

Figure 1:
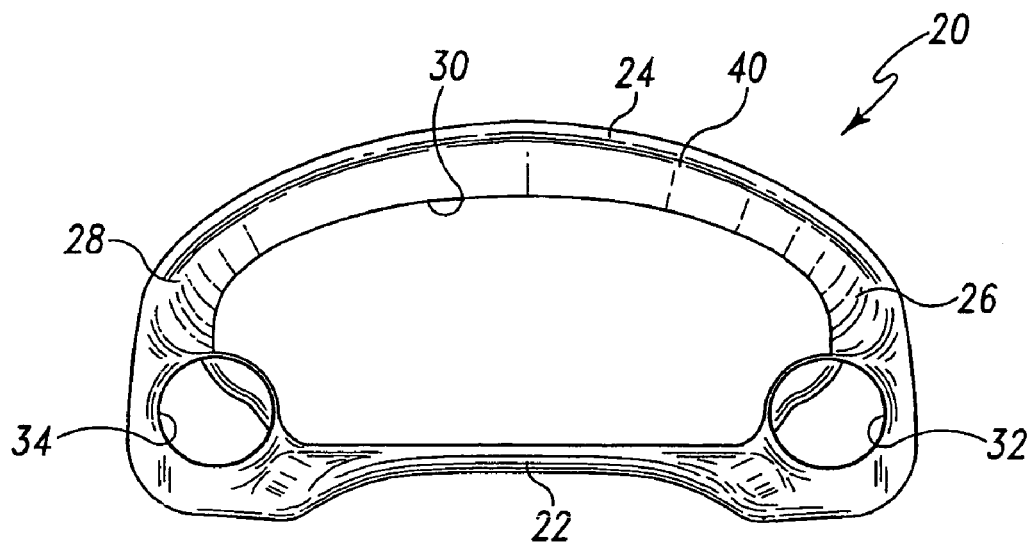
FIG. 1 is a front perspective view of an uninstalled and unpainted bezel without instruments mounted therein, in accordance with the principles of the present invention.
Figure 2:
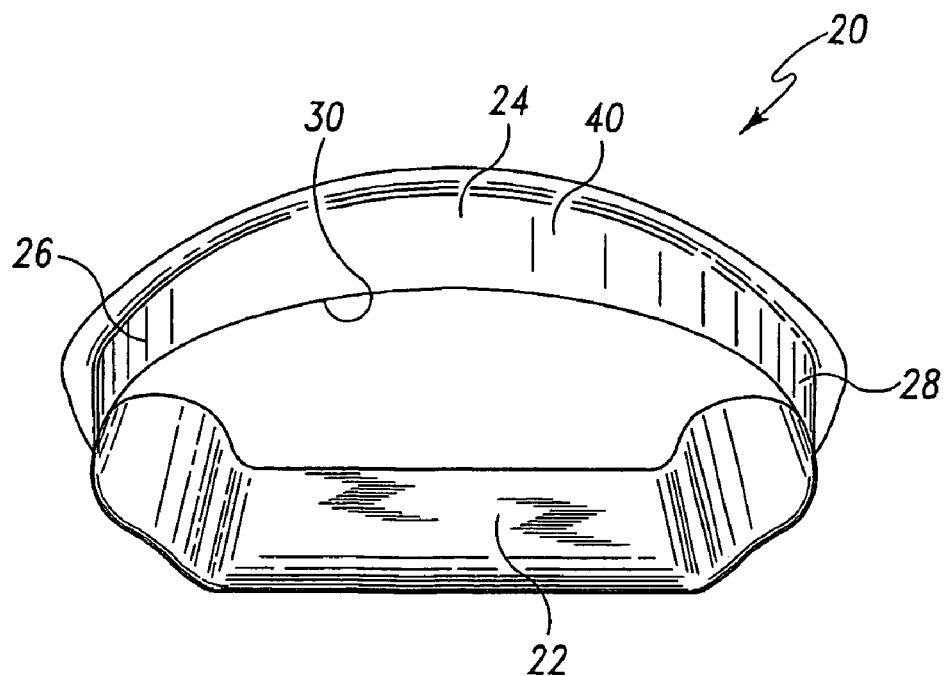
FIG. 2 is a rear perspective view of the bezel of FIG. 1.
Figure 3:
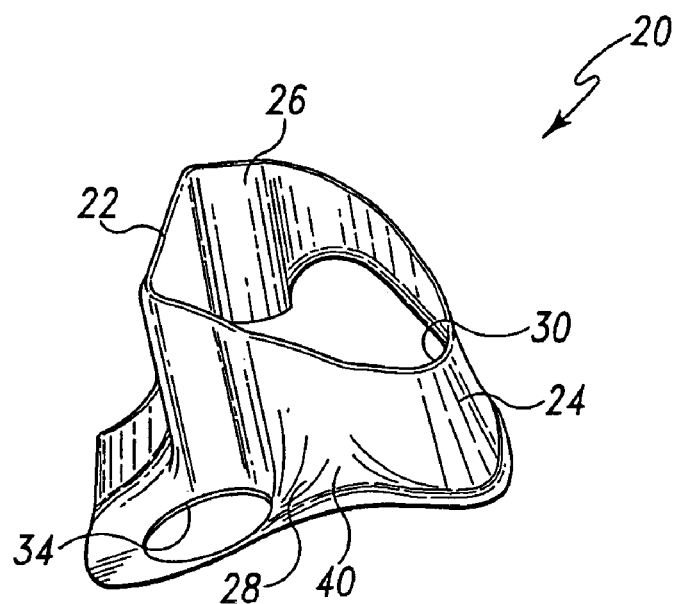
FIG. 3 is a left side perspective view of the bezel of FIG. 1.
Figure 4:
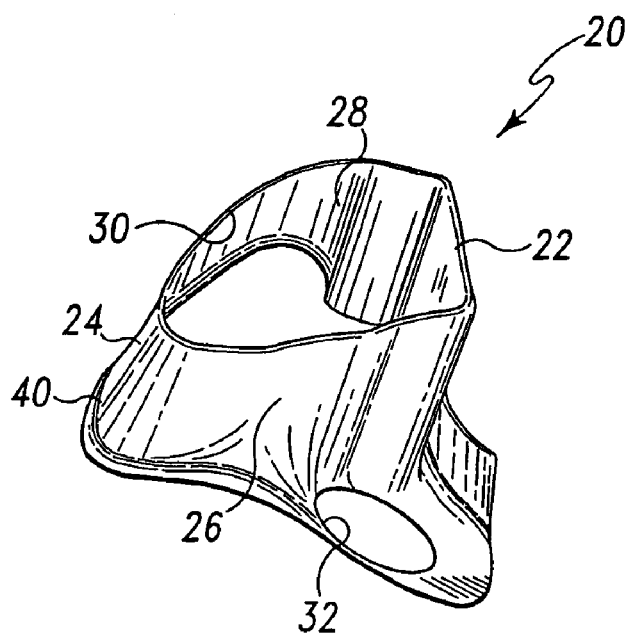
FIG. 4 is right side perspective view of the bezel of FIG. 1.
Figure 5:
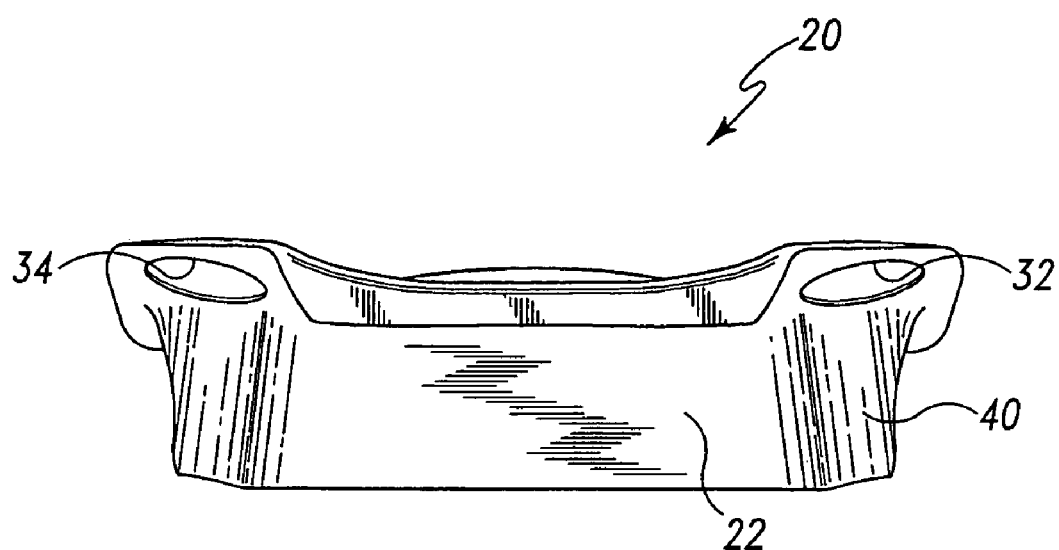
FIG. 5 is a bottom perspective view of the bezel of FIG. 1.
Figure 6:
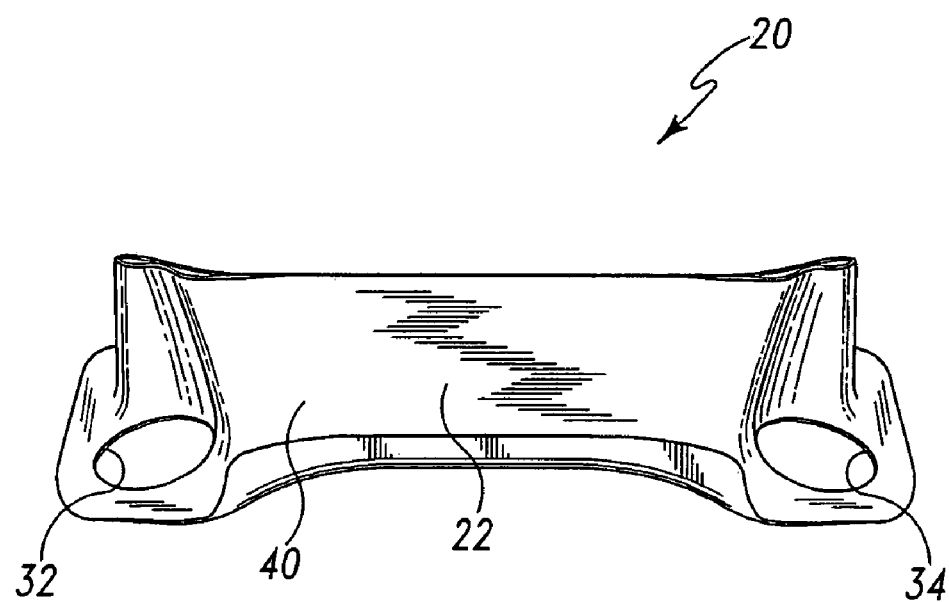
FIG. 6 is a bottom perspective view of the bezel of FIG. 1 turned 180° relative to FIG. 5.
Figure 7:
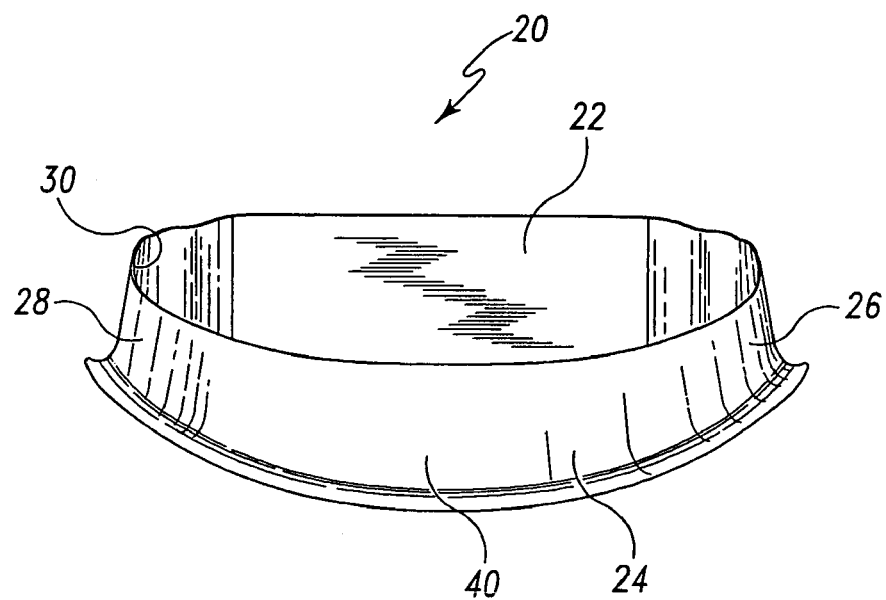
FIG. 7 is a top perspective view of the bezel of FIG. 1.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

With reference to FIGS. 1-7, there is shown a bezel, generally designated 20 in accordance with the principles set forth herein. The bezel 20 includes a body 40 which includes a lower body or housing portion 22 and an upper body or housing portion 24 that are each connected to a right body or housing portion 26 and a left body or housing portion 28. It should be appreciated that the bezel 20 may be formed as a single, integral piece, or as two or more pieces (i.e. body or housing portions) joined together. The bezel 20 is preferably constructed of fiberglass, but may be constructed, fabricated, molded and/or the like from any suitable material including, but not limited to, plastic, carbon fiber, metal, and/or the like.

Figure 8:
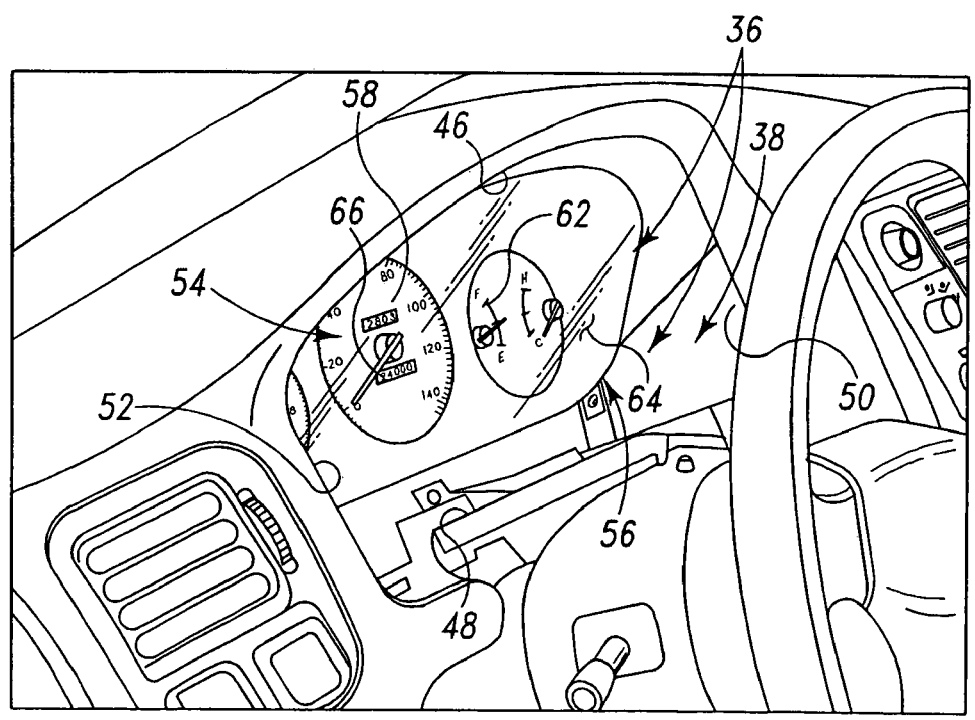
FIG. 8 is a left side perspective view of a dashboard of an automobile with the automobile manufacturer's dashboard bezel removed.
Figure 9:
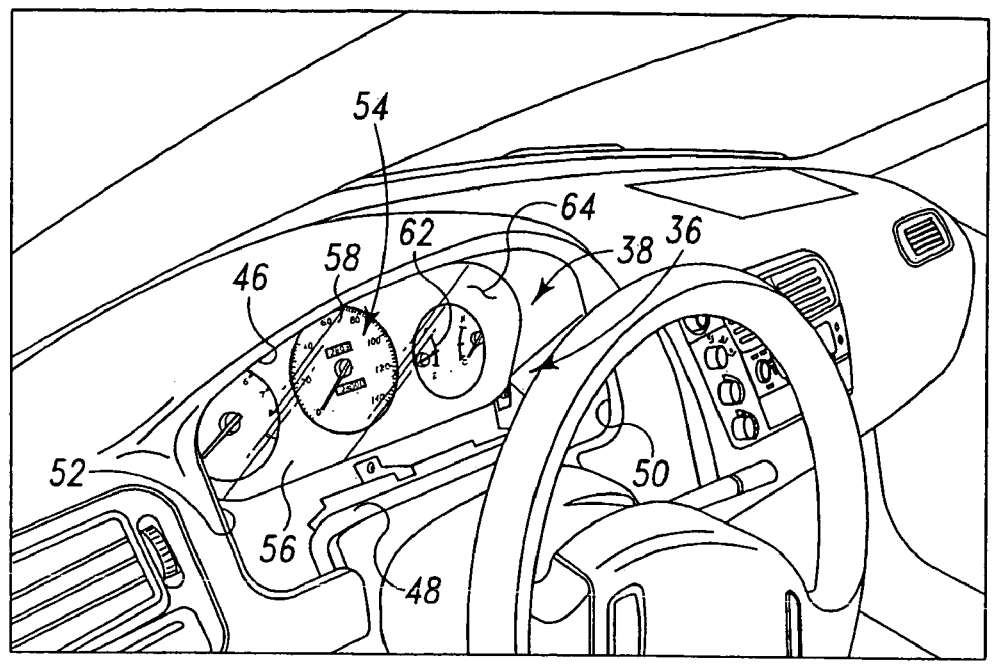
FIG. 9 is another left side perspective view of the dashboard of the automobile of FIG. 8 with the automobile manufacturer's dashboard bezel removed.
Figure 10:
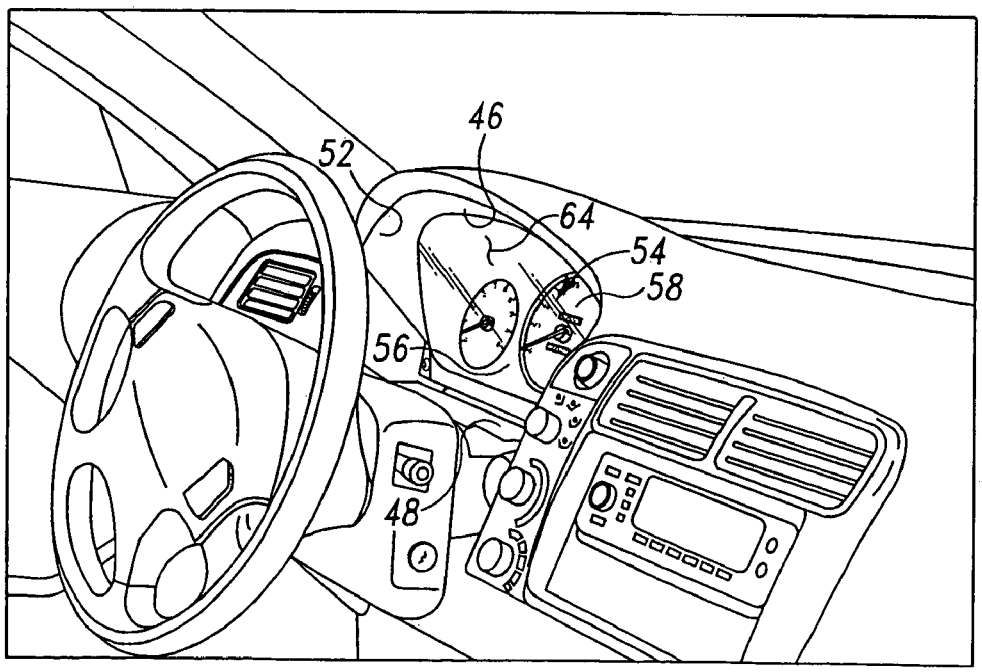
FIG. 10 is a right side perspective view of the dashboard of the automobile of FIG. 8 with the automobile manufacturer's dashboard bezel removed.
Figure 11:
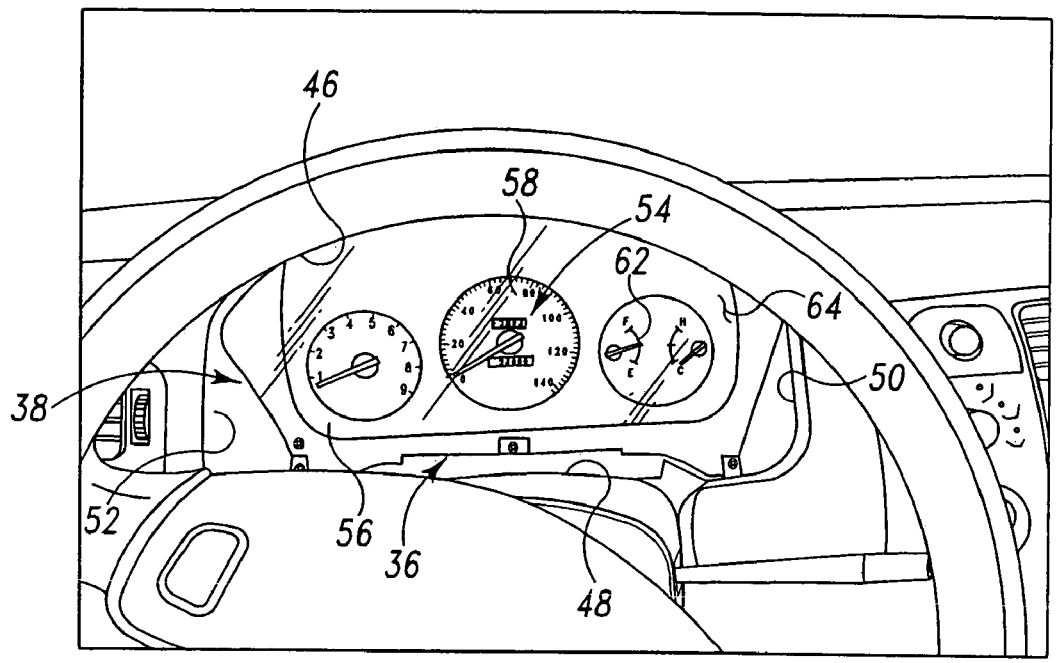
FIG. 11 is a front perspective view of the dashboard of the automobile of FIG. 8 with the automobile manufacturer's dashboard bezel removed.

The lower, upper, right, and left body portions 22, 24, 26, and 28, respectively, form a central or viewing opening 30 that is adapted to allow the essentially unobstructed viewing of existing, original, and/or factory-installed instruments/gauges in a dashboard 36 of the automobile. In particular, the dashboard 36 of an automobile is generally constructed to include an instrument cluster assembly 54 (see FIG. 8). The instrument cluster assembly 54 is generally a sealed assembly having a housing 56 which houses the electronics, wiring, and other components (not shown) associated with a number of instruments such as a speedometer 58 and a fuel gauge 62. A plastic window 64 is generally secured to the housing 56 so as to protect the instruments (e.g. the speedometer 58 and the fuel gauge 62) therein. The entire instrument cluster assembly 54 is generally sealed together in a secure manner so as to prevent tampering with the components associated with the assembly 54. Specifically, the plastic window 64 is generally sealed to the housing 56 in a secure manner to prevent tampering with an odometer 66 associated with the instrument cluster assembly 54 thereby preventing someone with illicit intentions from reducing the number of miles displayed by the odometer 66. Hence, as described herein, the term "instrument cluster assembly" is intended to mean the collection of instruments which are housed together within the assembly of the housing 56 and the window 64. Typically, the instrument cluster assembly 54 is installed by the manufacturer of the automobile at the assembly plant (i.e. the original equipment manufacturer or OEM).

Figure 19:
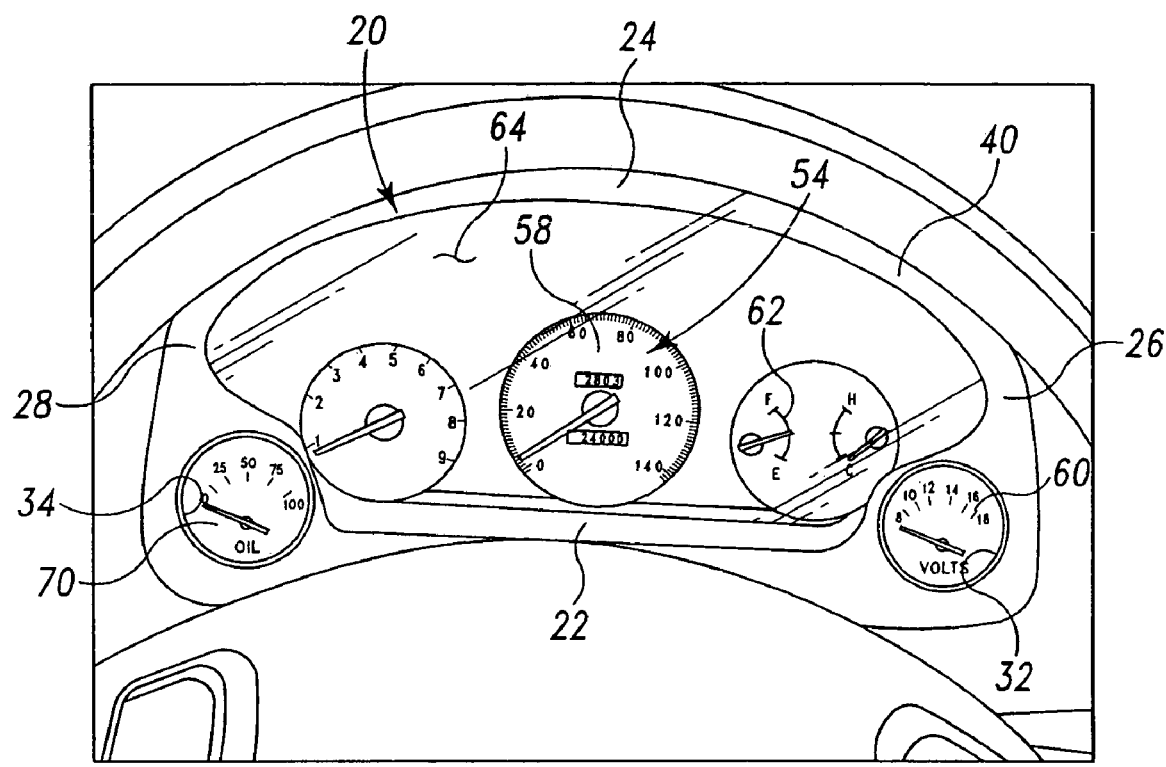
FIG. 19 is a front perspective view of the dashboard of the automobile of FIG. 8 with a finished bezel according to the present invention installed therein with additional instruments retained thereby.

As shown in FIG. 19, the body 40 of the replacement dashboard bezel 20 is configured to surround the window 64 of the instrument cluster assembly 54. What is meant herein by the term "surround" in regard to a dashboard bezel is that the body of the bezel defines a frame-like structure which borders substantially the entire periphery of the window of the instrument cluster assembly. Hence, the replacement dashboard bezel 20 (or the original dashboard bezel 80 of FIGS. 20 and 21) "surrounds" the window of the instrument cluster assembly much in the same way that a picture frame surrounds a picture.

It should be appreciated that the term "instrument" is utilized herein to mean any instrument, gauge, display, light, or the like that may be used to indicate a property, state, or measurement data with regard to the engine of an automobile, any other automobile function or feature, or an automobile in general. As described above, certain instruments are included in the automobile's instrument cluster assembly 54. However, as shall now be described in greater detail, other instruments may be provided as "stand alone" instruments which are installed in the vehicle subsequent to manufacture thereof (i.e. after-market instruments).

The dashboard bezel 20 also includes a first instrument mount or pod 32 and a second instrument mount or pod 34. It should be appreciated that the terms "instrument mount" or "instrument pod" are herein intended to mean any mounting and/or retaining configuration, device, assembly, feature, or the like that is operable or otherwise adapted to mount, retain, and/or hold an instrument. The first instrument mount 32 is shown as a generally circular opening in order to accommodate a first generally circular instrument 60 (see FIG. 19). The first instrument mount 32 is formed so as to allow a cable, signal line, or the like to be coupled to the instrument without interfering with the driver's view of the instruments associated with the instrument cluster assembly 54 or with any other part of the vehicle. The second instrument mount 34 is shown as a generally circular opening in order to accommodate a second generally circular instrument 70 (see FIG. 19). The second instrument mount 34 is formed so as to allow a cable, signal line, or the like to be coupled to the instrument without interfering with the driver's view of the instruments associated with the instrument cluster assembly 54 or with any other part of the vehicle. Although the first and second instrument mounts 32 and 34, respectively, are herein described and shown as being circular in shape, it should be appreciated they may be configured in any shape and/or size (i.e. dimension) in order to accommodate a like dimensioned instrument.

The first instrument mount 32 is shown as situated at a lower right corner of the bezel 20 between the lower body portion 22 and the right body portion 26, or adjacent a corner defined at the intersection of the lower body portion 22 and the right body portion 26. The second instrument mount 34, on the other hand, is shown as situated at a lower left corner of the bezel 20 between the lower body portion 22 and the left body portion 28, or adjacent a corner defined at the intersection of the lower body portion 22 and the left body portion 28. While the first and second instrument mounts 32 and 34 are shown in the lower corners of the bezel 20, it should be appreciated that the location or placement of the instrument mounts 32 and 34 in the figures is only exemplary, and thus may vary as necessary or desired. As well, while there are only two instrument mounts shown in the bezel 20 of FIGS. 1-7, the bezel 20 may be configured to include more or less than two instrument mounts, limited only by the resulting integrity of the bezel 20 and/or the physical dimension of the bezel 20 and the instruments to be accommodated.

Therefore, in accordance with the above, it should be appreciated that the number and dimension of instrument mounts of the bezel 20 may vary depending on the type of instrument that is to be accommodated by the respective instrument mount.

Further, an instrument mount may be integrally formed with any one of the body portions 22, 24, 26, or 28, or at the corner or intersection between either the upper body portion 24 and the right and left side body portions 26 or 28, or the lower body portion 22 and the right and left side body portions 26 or 28 such as is shown in the figures. Alternatively, an instrument mount may be formed as a separate piece and attached or coupled to any one of the body portions 22, 24, 26, or 28, or at the corner or intersection between either the upper body portion 24 and the right or left side body portions 26 or 28, or the lower body portion 22 and the right or left side body portions 26 or 28.

What has been shown and described above with reference to FIGS. 1-7 is an exemplary dashboard bezel in accordance with the present principles. Thus, it should be appreciated that dashboard bezels having various combinations of instrument mounts, (i.e. in size, shape, and/or placement) may be produced to accommodate the various sizes and shapes of the instruments to be retained by the respective instrument mount. The number of instrument openings and/or their configuration may vary in accordance with the type of instrument, gauge or the like which will be mounted in the instrument mounting. The dashboard bezel 20 shown in the figures is, therefore, only exemplary of one style or embodiment of the present invention. There are infinite variations or combinations possible in accordance with the principles of the present invention herein presented. As an example, the lower body portion 22 may contain one or a plurality of instrument mounts (not shown).

With reference now to FIGS. 8-11, there is shown a dashboard 36 of an automobile in which an original or factory-installed (i.e. OEM) dashboard bezel 80 (see FIGS. 20-21) has been removed. It should be appreciated that the removed bezel 80 could, in fact, be a replacement dashboard bezel that does not have supplemental instrument pods associated therewith. In either case, the removed bezel (albeit OEM or a replacement) is hereinafter referred to as the "original dashboard bezel". In any event, the removal of the original dashboard bezel 80 exposes a bezel mounting space 38 that essentially surrounds or encompasses the window 64 of the instrument cluster assembly 54. As discussed above, the instrument cluster assembly 54 includes the original, factory-installed instruments such as the speedometer 58 and the fuel gauge 62. It should be appreciated that the number, layout, and type of original or factory-installed instruments depend on many factors, such as the model type and options associated with the automobile.

The bezel mounting space 38 essentially defines an upper bezel mounting space portion 46, a lower bezel mounting space portion 48, a right bezel mounting space portion 50, and a left bezel mounting space portion 52. The upper body portion 24 of the bezel 20 corresponds at least generally in dimension to the upper bezel mounting space portion 46. The lower body portion 22 of the bezel 20 corresponds at least generally to the lower bezel mounting space portion 48. The right body portion 26 of the bezel 20 corresponds at least generally to the right bezel mounting space portion 50. The left body portion 28 corresponds at least generally to the left bezel mounting space portion 52.

Figure 20:
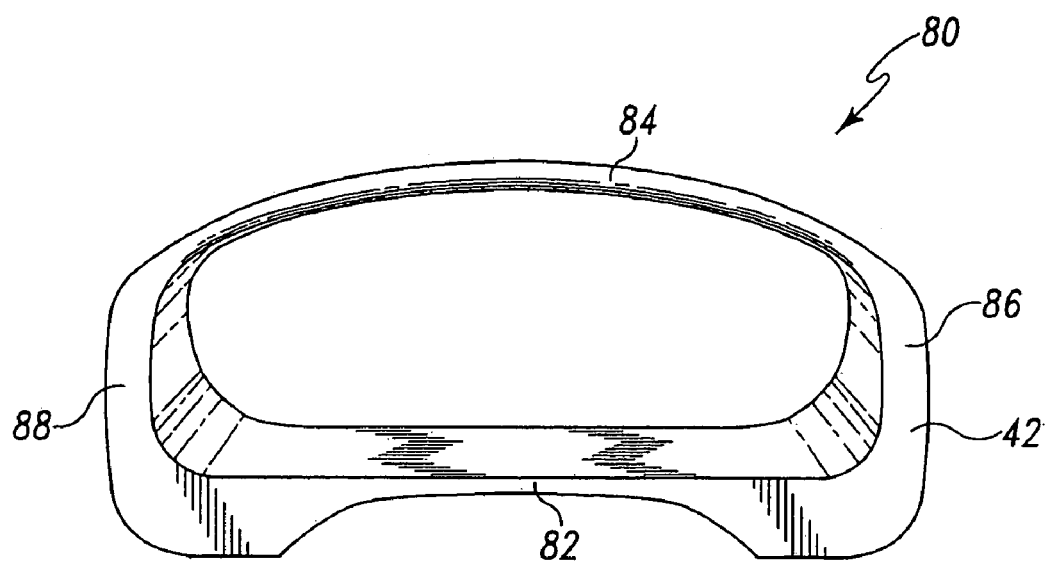
FIG. 20 is a front perspective view of the original dashboard bezel subsequent to removal thereof from the automobile.
Figure 21:
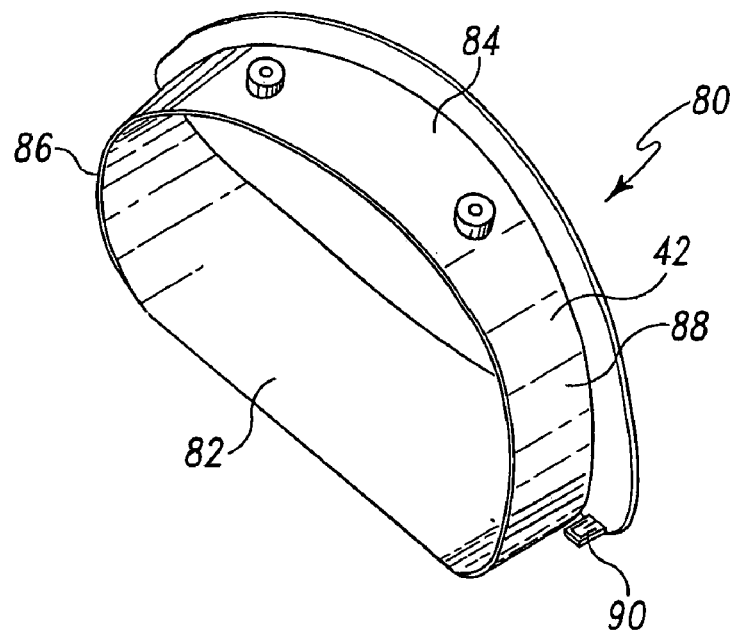
FIG. 21 is a rear perspective view of the original dashboard bezel of FIG. 20.

It should be appreciated that the dimensions of the upper, lower, right, and left bezel mounting space portions 46, 48, 50, and 52 are particular to the make and/or model of the automobile. As well, the automobile shown in FIGS. 8-19 is an example of one type of automobile in order to describe the present invention. In order for the bezel 20 to fit into the bezel mounting space 38, the dimensions of the lower, upper, right, and left body portions 22, 24, 26, and 28 are generally the same as, or otherwise correspond to, the dimensions of the lower, upper, right, and left bezel mounting space portions 46, 48, 50, and 52. The bezel 20 would thus be dimensioned quite similarly to the original dashboard bezel 80 (e.g. the OEM dashboard bezel) that was removed from the dashboard 36. Indeed, as shown in FIGS. 20-21, the original dashboard bezel 80 has a body 42 which includes a lower body or housing portion 82 and an upper body or housing portion 84 that are each connected to a right body or housing portion 86 and a left body or housing portion 88. The body portions 82, 84, 86, 88 of the original dashboard bezel 80 are substantially identical to the body portions 22, 24, 26, 28 except that the body portions 82, 84, 86, 88 of the original dashboard bezel do not include any structures or features for accommodating the instrument mounts 32, 34.

Figure 12:
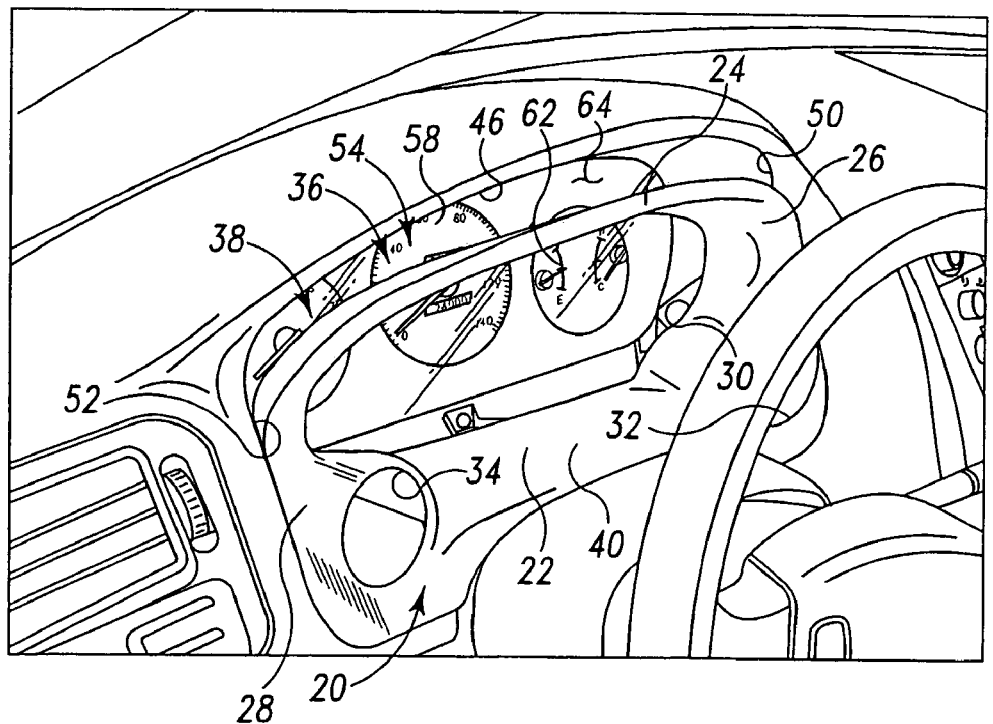
FIG. 12 is a left side perspective view of the dashboard of the automobile of FIG. 8 with the automobile manufacturer's dashboard bezel removed and the bezel of FIGS. 1-7 being installed therein.
Figure 13:
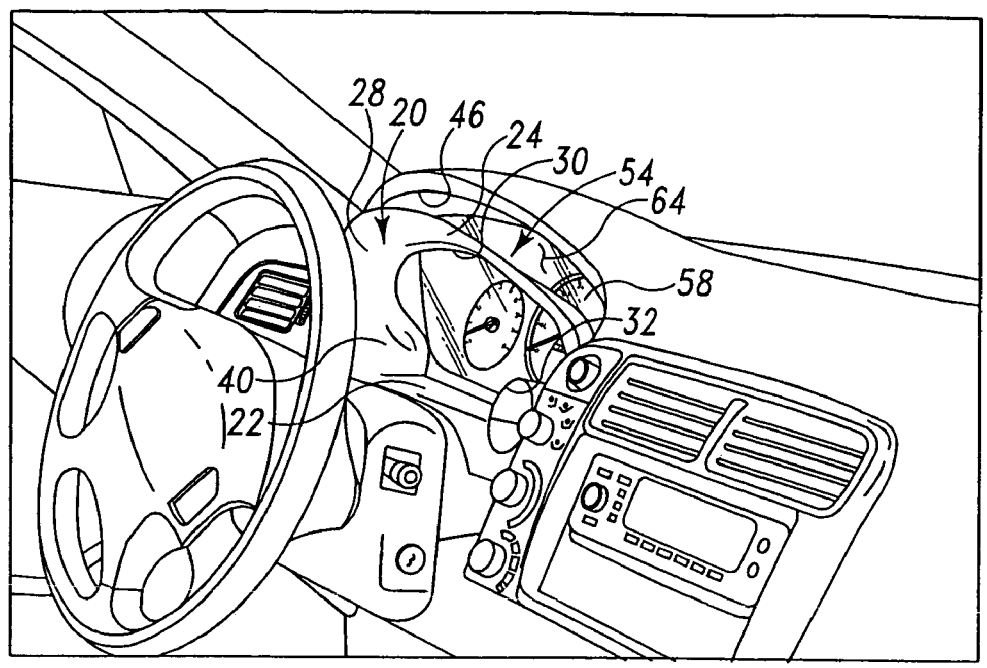
FIG. 13 is a right side perspective view of the dashboard of the automobile of FIG. 8 with the automobile manufacturer's dashboard bezel removed and the bezel of FIGS. 1-7 being installed therein.
Figure 14:
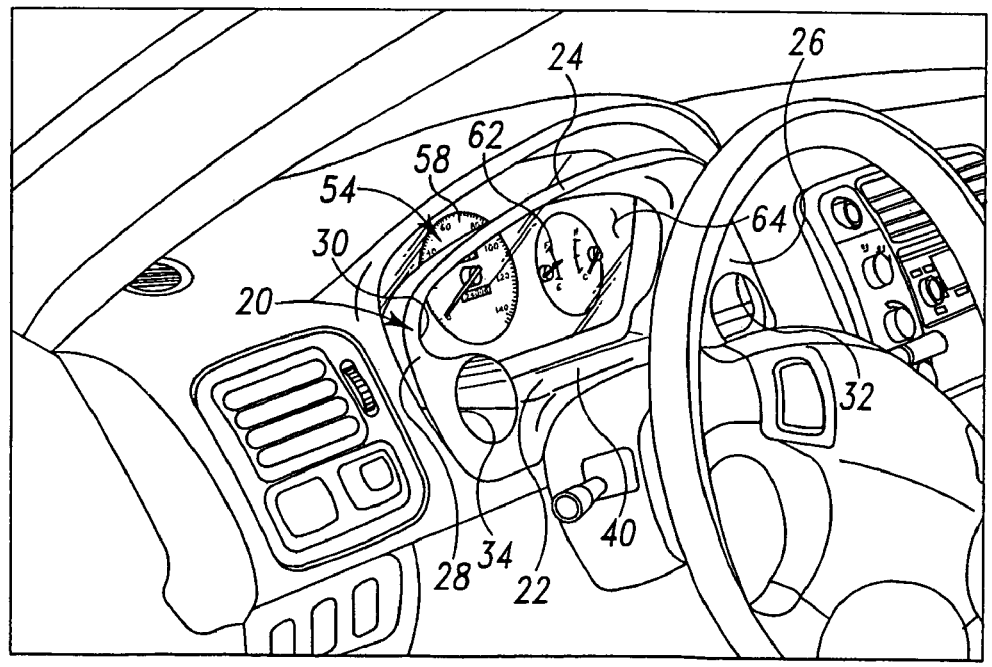
FIG. 14 is another left side perspective view of the dashboard of the automobile of FIG. 8 with the automobile manufacturer's dashboard bezel removed and the bezel of FIGS. 1-7 being installed therein.
Figure 15:
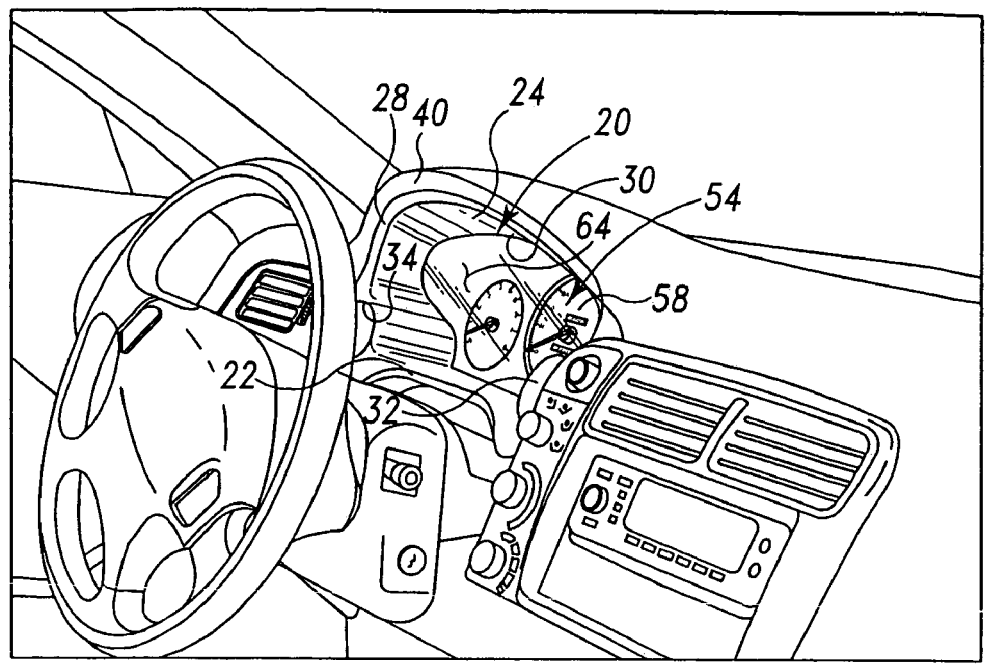
FIG. 15 is a right side perspective view of the dashboard of the automobile of FIG. 8 with the automobile manufacturer's dashboard bezel removed and the bezel of FIGS. 1-7 installed therein.
Figure 16:
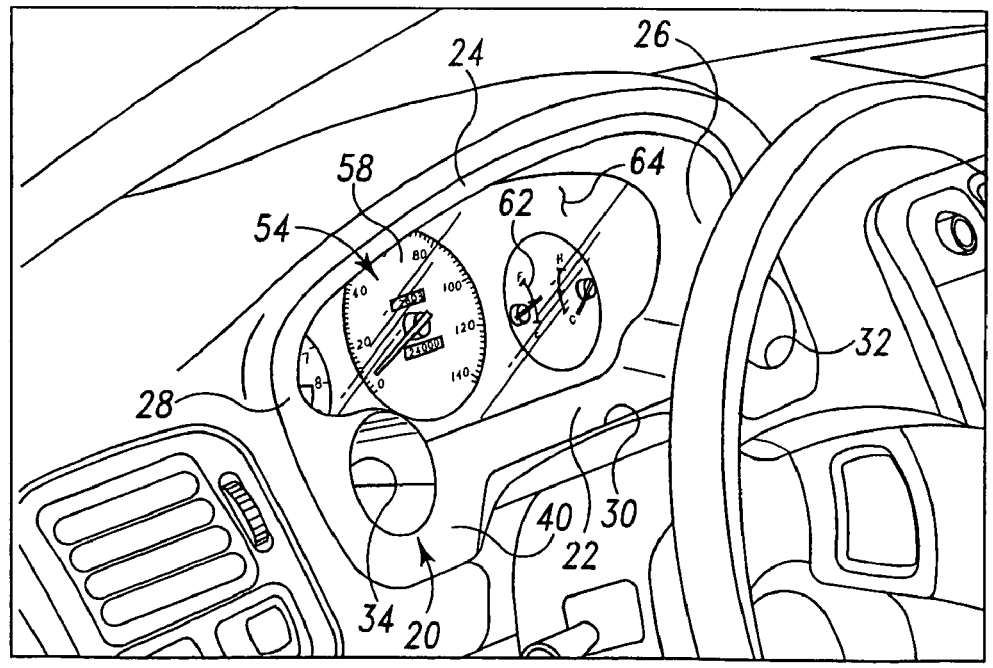
FIG. 16 is a left side perspective view of the dashboard of the automobile of FIG. 8 with the automobile manufacturer's dashboard bezel removed and the bezel of FIGS. 1-7 installed therein.
Figure 17:
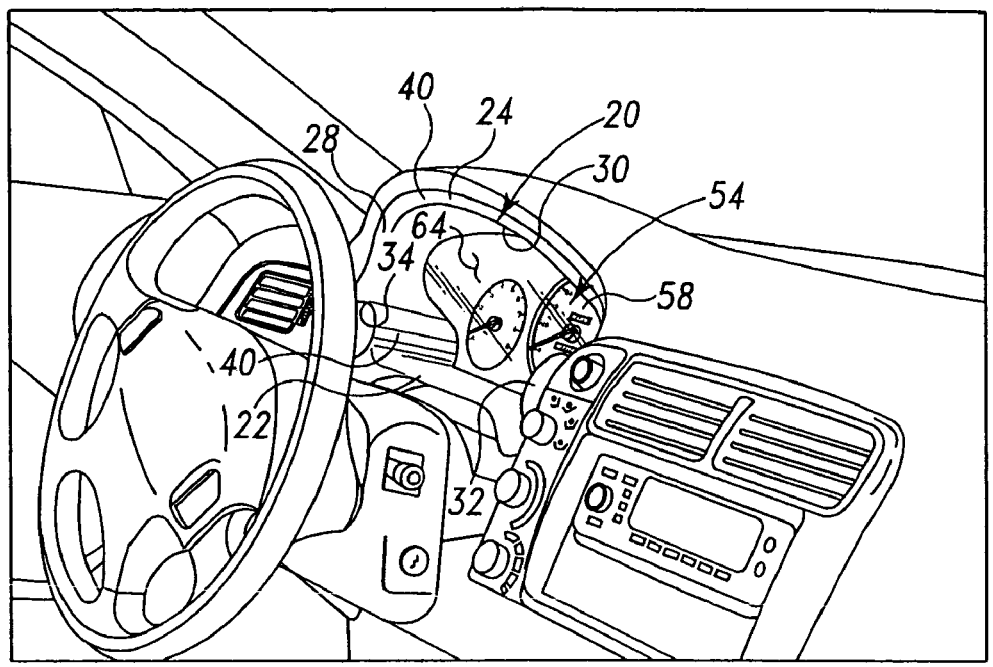
FIG. 17 is another right side perspective view of the dashboard of the automobile of FIG. 8 with the automobile manufacturer's dashboard bezel removed and the bezel of FIGS. 1-7 installed therein.
Figure 18:
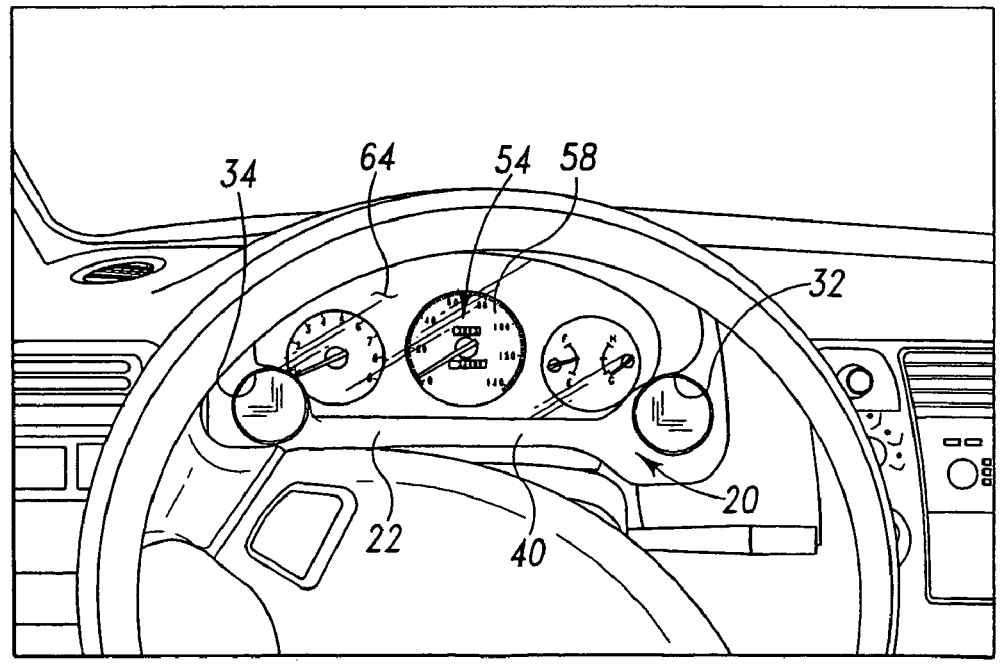
FIG. 18 is a front perspective view of the dashboard of the automobile of FIG. 8 with the automobile manufacturer's dashboard bezel removed and the bezel of FIGS. 1-7 installed therein.

In FIGS. 12-14, the dashboard bezel 20 is shown being installed or otherwise inserted into the bezel mounting space 38 of the automobile after the original dashboard bezel 80 has been removed. It should be appreciated the after-market instruments 60, 70 have been removed from the bezel 20 in FIGS. 12-14 for clarity of description. The dashboard bezel 20 is dimensioned to essentially replace the original dashboard bezel 80, but provide for the mounting of additional or supplemental instruments 60, 70 at a location that is proximate to the original instruments associated with the instrument cluster assembly 54 (e.g. the speedometer 58 and the fuel gauge 62).

It is thus desirable and preferred to remove the original dashboard bezel 80 (see FIGS. 20 and 21) from the automobile before installing the replacement dashboard bezel 20. In one embodiment, however, it is not necessary that the original dashboard bezel 80 be removed, since the replacement dashboard bezel 20 may be dimensioned so as to be installed over, or surrounding, the original dashboard bezel 80. If the original dashboard bezel 80 is not being removed, the bezel mounting space 38 becomes a surface defined by the original dashboard bezel 80 and the replacement bezel 20 would therefore be dimensioned accordingly.

Referring now to FIGS. 15-18, the replacement dashboard bezel 20 has been fully inserted into the bezel mounting space 38. As with FIGS. 12-14, the after-market instruments 60, 70 have been removed from the bezel 20 in FIGS. 15-18 for clarity of description. The replacement dashboard bezel 20 is inserted into the bezel mounting space 38 in the same manner as the original dashboard bezel 80 was inserted (or would be reinserted) therein. It should be appreciated that the replacement dashboard bezel 20 is configured to include the same mounting features as the original dashboard bezel 80. In particular, the replacement dashboard bezel 20 may be configured to include a number of clips (not shown) which are identical to a number of clips 90 (see FIG. 21) associated with the original dashboard bezel 80. In this manner, the replacement dashboard bezel 20 may be secured within the bezel mounting space 38 in the same manner as was the original dashboard bezel 80. It should also be appreciated from the above discussion that the replacement dashboard bezel 20 could therefore be configured with other mounting features such as fasteners, or apertures for receiving fasteners, if the original dashboard bezel 80 was likewise configured.

Referring to FIG. 19, the replacement bezel 20 is shown with the first instrument 60 disposed in the first instrument mount 32 and the second instrument 70 disposed in the second instrument mount 34. The first and second instruments 60 and 70 may be retained in their respective instrument mount 32, 34 via a press fit, clamps, or any other manner.

Further, the replacement bezel 20 may be painted or have a color formed or molded therein to match the interior color of the automobile, or any other color as desired. As well, the bezel 20 may be configured in multiple colors or have graphics, patterns, and/or the like associated therewith. It should be appreciated that there are a multitude of variations.

Operation of the Present Invention

Figure 22:
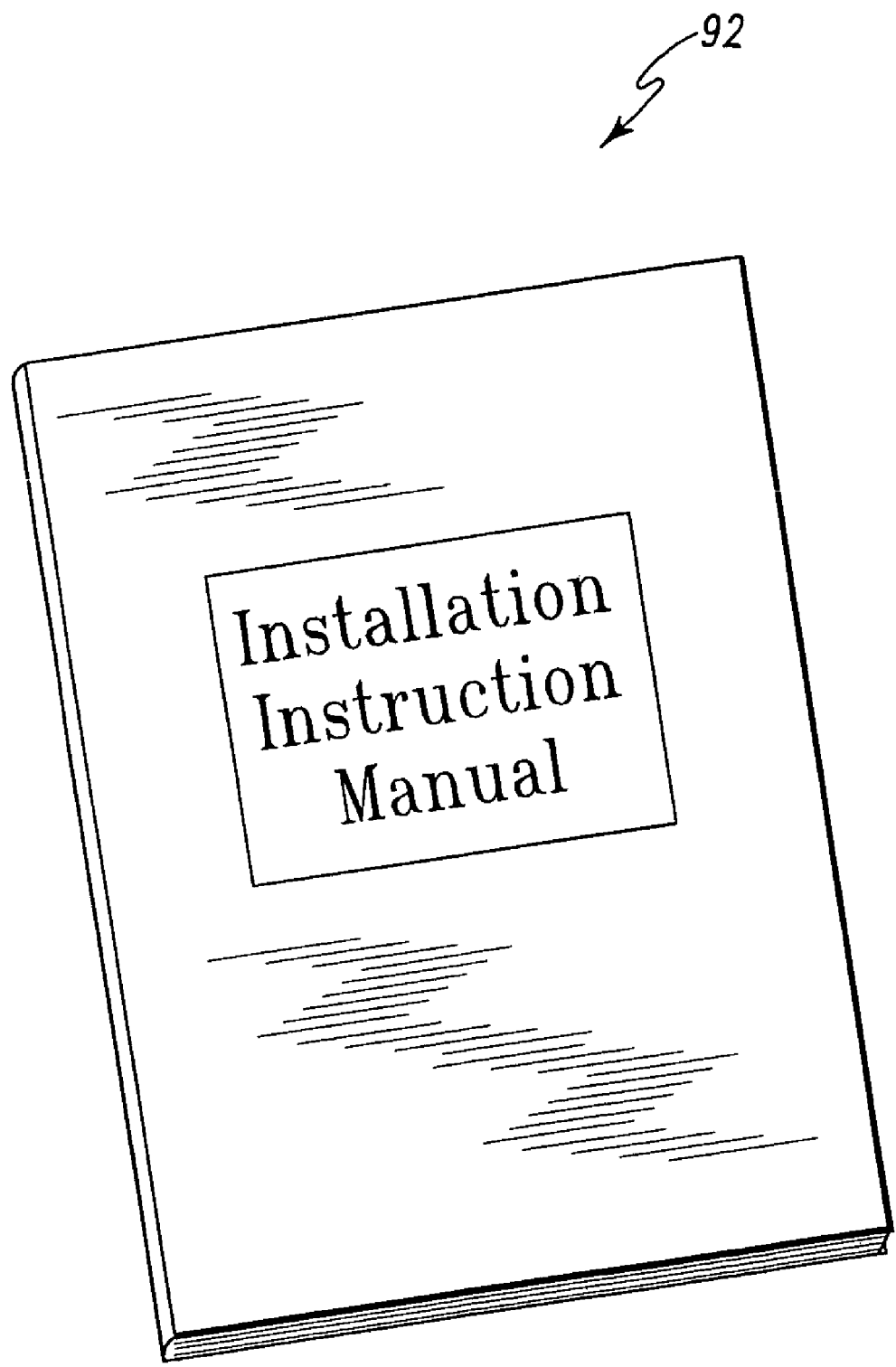
FIG. 22 is a perspective view of an installation instruction manual which provides instructions relating to installation of the replacement dashboard bezel of FIG. 1.

In operation, the replacement dashboard bezel 20 of the present invention may be utilized to replace the original dashboard bezel 80 of an automobile thereby allowing for the positioning of a number of after-market instruments 60, 70 proximate to the instruments associated with the automobile's factory installed instrument cluster assembly 54 (e.g. the speedometer 58 and the fuel gauge 62). As shown in FIG. 22, if the replacement dashboard bezel 20 is provided as part of a kit, such as an after-market kit, the bezel is typically packaged with an installation instruction manual 92 which includes the printed instructions for installing the bezel 20 into an automobile in the manner which will now be described.

In any event, the process begins by removal of the original dashboard bezel 80 from the dashboard 36 of the automobile. In particular, the fasteners, clips, or any other retaining mechanisms (e.g. the clips 90) which are utilized to secure the original dashboard bezel 80 within the bezel mounting space 38 of the dashboard 36 are disengaged so as to allow the original dashboard bezel 80 to be spaced apart from the instrument cluster assembly 54 or otherwise lifted away from the dashboard 36. As shown in FIGS. 8-11, such removal of the original dashboard bezel 80 exposes the window 64 and the housing 56 of the instrument cluster assembly 54.

Thereafter, the additional instruments 60, 70 are secured within the instrument mounts 32, 34, respectively, of the replacement dashboard bezel 20. Moreover, the wires, signal lines, or the like associated with the instruments 60, 70 are coupled to the instruments 60, 70 and thereafter routed along the rear portion of the replacement dashboard bezel 20.

The replacement dashboard bezel 20 is then aligned with the corresponding surfaces of the bezel mounting space 38 and thereafter advanced into the dashboard 36. Specifically, the replacement dashboard bezel 20 is advanced into the bezel mounting space 38 and thereafter secured to the dashboard 36 by use of clips, fasteners, or other mechanisms (not shown) which are similar to those that were used to secure the original dashboard bezel 80 within the bezel mounting space 38 of the dashboard 36. Once done, the after-market instruments 60, 70 are fully operational for use by the driver of the automobile.

Hence, as described herein, the replacement dashboard bezel 20 of the present invention has a number of advantages over heretofore designed mechanisms for mounting after-market instruments. For example, the replacement dashboard bezel 20 of the present invention allows after-market instruments to be installed in the automobile in a manner which appears "integrated" with the automobile's original instrument cluster assembly thereby increasing the aesthetic appearance of the dashboard. Moreover, the replacement dashboard bezel 20 of the present invention allows after-market instruments to be installed in a location within the automobile that allows the information displayed by the instrument to be quickly and safely obtained by the driver. Moreover, by eliminating the need to mount after-market instruments on, for example, the A-pillar of the automobile, use of the replacement dashboard bezel 20 of the present invention provides the driver with a relatively unobstructed view of the road.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the replacement dashboard bezel and associated method described herein. It will be noted that alternative embodiments of the replacement dashboard bezel and associated method of the present invention may not include all of the features described yet still benefit from at least some of the advantages of such features. Those of ordinary skill in the art may readily devise their own implementations of a replacement dashboard bezel and associated method that incorporate one or more of the features of the present invention and fall within the spirit and scope of the present invention as defined by the appended claims.

For example, although the replacement instruments 60, 70 are herein described as being installed in the instrument mounts 32, 34, respectively, prior to installation of the replacement dashboard bezel 20 within the bezel mounting space 38 of the dashboard 36, and has significant advantages thereby in the present invention, it should be appreciated that other configurations are also possible. In particular, the instrument mounts 32, 34 may be configured to receive the after-market instruments 60, 70 from the front side of the replacement dashboard bezel 20. In such a configuration, the replacement dashboard bezel 20 would be installed within the bezel mounting space 38 of the dashboard 36 without the instruments 60, 70 secured thereto, but with the coupling end of the wires, signal lines or the like associated with such instruments 60, 70 hanging out from the front openings of the instrument mounts 32, 34, respectively. Once the replacement dashboard bezel 20 is secured 80 within the bezel mounting space 38 of the dashboard 36, the respective coupling end of the wires or signal lines are secured to the instruments 60, 70. The instruments 60, 70 may then be advanced into the instrument mounts 32, 34 from the front side of the replacement dashboard bezel 20. It should be appreciated that during such advancement of the instruments 60, 70 through the front side of the replacement dashboard bezel 20, the wires or signal lines associated with the instruments are contemporaneously guided back into the instrument mounts 32, 34 so as to prevent them from being pinched or dangling from the bezel 20 within the view of the driver.

What is claimed is:

1. A method of adding an additional instrument to a vehicle having a dashboard housing and an instrument cluster assembly, comprising the steps of:
    removing an original dashboard bezel from a bezel mounting space defined between said dashboard housing and said instrument cluster assembly, said original dashboard bezel possessing no instrument mounts;
    installing a replacement dashboard bezel in said bezel mounting space, said replacement dashboard bezel having (i) a body substantially conforming in dimension to said original dashboard bezel, and (ii) at least one instrument mount; and
    locating an instrument in said at least one instrument mount.

2. The method of claim 1, wherein said locating step occurs after said installing step.

3. The method of claim 1, wherein said locating step occurs before said installing step.

4. The method of claim 1, wherein said at least one instrument mount includes an opening configured to receive said additional instrument.

5. The method of claim 1, wherein:
    said instrument cluster assembly includes a window and a speedometer,
    said speedometer is located on a backside of said window whereby a driver of said vehicle may view said speedometer through said window, and
    said instrument mount is located on a front side of said window after said replacement dashboard bezel is installed in said installing step.

6. The method of claim 1, wherein said instrument cluster assembly includes a speedometer.

7. The method of claim 1, wherein:
    said dashboard housing includes a rim which defines a viewing opening through which a driver of said vehicle may view said instrument cluster assembly, and
    said installing step includes the step of securing said replacement dashboard bezel adjacent to said rim.

8. An after-market dashboard bezel, comprising:
    a body configured to be mounted in a bezel mounting space defined between a dashboard housing and an instrument cluster assembly of a vehicle; and
    an instrument mount secured to said body.

9. The after-market dashboard bezel of claim 8, wherein:
    said body is formed by an upper body portion, a lower body portion, a right side portion coupled to a first side of said upper body portion and a first side of said lower body portion, and a left side portion coupled to a second side of said upper body portion and a second side of said lower body portion, and
    said upper body portion, said lower body portion, said right side portion, and left side portion collectively define a viewing opening.

10. The after-market dashboard bezel of claim 9, wherein said instrument mount is positioned proximate to said lower body portion.

11. The after-market dashboard bezel of claim 10, further comprising a second instrument mount disposed proximate said lower body portion.

12. The after-market dashboard bezel of claim 11, wherein:
    said first instrument mount is positioned proximate to said right side portion, and
    said second instrument mount is positioned proximate to said left side portion.

13. The after-market dashboard bezel of claim 8, wherein said instrument mount is integrally formed with said body.

14. The after-market dashboard bezel of claim 9, wherein said upper body portion, said lower body portion, said right side portion, and left side portion of said body are integrally formed with one another.

15. A method of modifying a vehicle having a dashboard housing and an instrument cluster assembly, comprising the steps of:
removing an original dashboard bezel from a bezel mounting space defined between said dashboard housing and said instrument cluster assembly, said original dashboard bezel possessing no instrument mounts; and
installing a replacement dashboard bezel in said bezel mounting space, said replacement dashboard bezel having at least one instrument mount.

16. The method of claim 15, wherein said at least one instrument mount is configured to retain an additional instrument.

17. The method of claim 15, wherein:
said instrument cluster assembly includes a window and a speedometer,
said speedometer is located on a backside of said window whereby a driver of said vehicle may view said speedometer through said window, and
said instrument mount is located on a front side of said window after said replacement dashboard bezel is installed in said installing step.

18. The method of claim 15, wherein said instrument cluster assembly includes a speedometer.

19. The method of claim 15, wherein:
said dashboard housing includes a rim which defines a viewing opening through which a driver of said vehicle may view said instrument cluster assembly, and
said installing step includes the step of securing said replacement dashboard bezel adjacent to said rim.

20. A method of adding an instrument to a vehicle that includes a speedometer, comprising the steps of:
removing an original vehicle part from a mounting space of the vehicle, wherein the original vehicle part has a viewing opening through which a driver of the vehicle may view the speedometer when the original vehicle part is located in the mounting space of the vehicle, and wherein the original vehicle part possesses no instrument mounts;
installing a replacement vehicle part in the mounting space after the removing step, wherein the replacement vehicle part has at least one instrument mount; and
locating the instrument in the at least one instrument mount.

21. The method of claim 20, wherein:
the vehicle further includes a dashboard having a dashboard opening through which the driver of the vehicle may view the speedometer,
the original vehicle part is configured to substantially conform to the dashboard opening, and
the replacement vehicle part is also configured to substantially conform to the dashboard opening.

22. The method of claim 21, wherein:
the dashboard includes a rim which defines the dashboard opening, and
the installing step includes the step of securing the replacement vehicle part adjacent to the rim.

23. The method of claim 20, wherein the locating step occurs after the installing step.

24. The method of claim 20, wherein the locating step occurs before the installing step.

25. The method of claim 20, wherein:
the vehicle includes an instrument cluster assembly having a housing and a window,
the instrument cluster assembly includes the speedometer,
the speedometer is located on a backside of the window whereby the driver of the vehicle may view the speedometer through the window, and
the at least one instrument mount is located on a front side of the window after the replacement vehicle part is installed in the vehicle in the installing step.

26. A method of modifying a vehicle that includes a speedometer, comprising the steps of:
removing an original vehicle part from a mounting space of the vehicle, wherein (i) the original vehicle part has a first viewing opening through which a driver of the vehicle may view the speedometer when the original vehicle part is located in the mounting space of the vehicle, and (ii) the original vehicle part possesses no instrument mounts; and
installing a replacement vehicle part in the mounting space after the removing step, wherein (i) the replacement vehicle part has a second viewing opening through which the driver of the vehicle may view the speedometer when the replacement vehicle part is located in the mounting space of the vehicle, and (ii) the replacement vehicle part possesses at least one instrument mount.

27. The method of claim 26, wherein:
the vehicle further includes a dashboard having a dashboard opening through which the driver of the vehicle may view the speedometer,
the original vehicle part is configured to substantially conform to the dashboard opening, and
the replacement vehicle part is also configured to substantially conform to the dashboard opening.

28. The method of claim 27, wherein:
the dashboard includes a rim which defines the dashboard opening, and
the installing step includes the step of securing the replacement vehicle part adjacent to the rim.

29. The method of claim 26, wherein:
the vehicle includes an instrument cluster assembly having a window,
the instrument cluster assembly includes the speedometer,
the speedometer is located on a backside of the window whereby the driver of the vehicle may view the speedometer through the window, and
the at least one instrument mount is located on a front side of the window after the replacement vehicle part is installed in the vehicle in the installing step.

* * * * *

(12) EX PARTE REEXAMINATION CERTIFICATE (6366th)
United States Patent
Jennings

(10) Number: US 7,264,074 C1
(45) Certificate Issued: Aug. 12, 2008

(54) AFTER-MARKET DASHBOARD BEZEL FOR AN AUTOMOBILE HAVING A NUMBER OF INSTRUMENT HOLDERS AND ASSOCIATED METHOD

(76) Inventor: Douglas M. Jennings, 10780 Affirmed Dr., Indianapolis, IN (US) 46234

Reexamination Request:
No. 90/008,861, Sep. 28, 2007

Reexamination Certificate for:
Patent No.: 7,264,074
Issued: Sep. 4, 2007
Appl. No.: 09/696,458
Filed: Oct. 25, 2000

Related U.S. Application Data
(60) Provisional application No. 60/207,584, filed on May 26, 2000.

(51) Int. Cl.
*B60K 37/04* (2006.01)

(52) U.S. Cl. ........................... 180/90; 296/70
(58) Field of Classification Search ............ 180/90; 296/70
See application file for complete search history.

(56) References Cited

U.S. PATENT DOCUMENTS

| | | |
|---|---|---|
| 1,518,420 A | 12/1924 | Turner |
| 2,423,597 A | 7/1947 | Hum |
| 5,224,751 A | 7/1993 | Hirashima et al. |
| 5,709,358 A | 1/1998 | Kubota |
| 5,883,777 A | 3/1999 | Nishitani et al. |
| 6,302,551 B1 | 10/2001 | Matumoto |
| 6,379,015 B2 | 4/2002 | Wilhelm et al. |
| 6,404,463 B1 | 6/2002 | Knoll et al. |
| 6,409,355 B1 | 6/2002 | Simon et al. |
| 6,490,776 B1 | 12/2002 | Gager et al. |
| 6,520,654 B2 | 2/2003 | Angell et al. |
| 6,575,583 B2 | 6/2003 | Suzuki et al. |
| 6,595,667 B1 | 7/2003 | Obata |
| 6,714,126 B2 | 3/2004 | Wada |
| 7,121,674 B2 | 10/2006 | Kraus et al. |
| 7,126,564 B2 | 10/2006 | Schach et al. |
| 7,243,882 B2 | 7/2007 | Day et al. |

*Primary Examiner*—Matthew C. Graham

(57) ABSTRACT

An instrument bezel for an automobile facilitates the addition of supplemental instruments to a vehicle while maintaining a clear and unobstructed view of the road for the driver without placing the supplemental instruments in a location that would make reading these instruments awkward and unsafe. The present instrument bezel is shaped to surround the dashboard of the automobile and replace an original instrument panel or dashboard bezel of the automobile. In one embodiment, the present instrument bezel includes integral pods or mounts on the bottom corners for retaining the supplemental instruments. The present instrument bezel may be made of fiberglass, carbon fiber, plastic, metal, or the like.

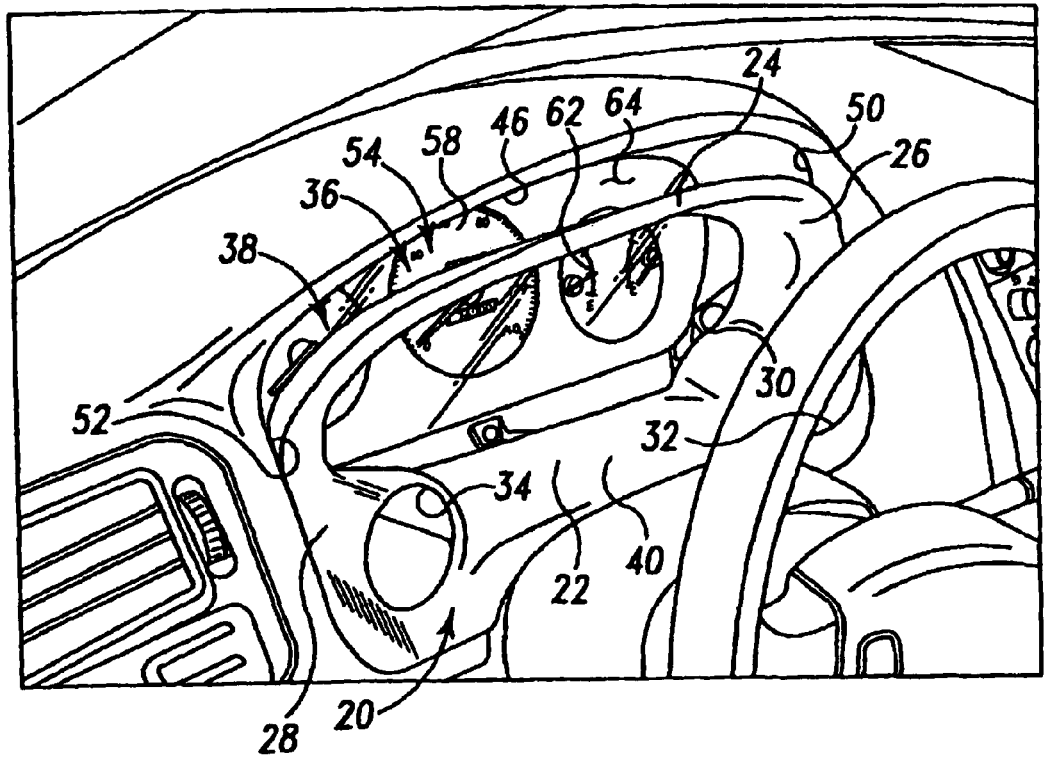

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–7 and 15–29 is confirmed.

Claims 8–14 are cancelled.

\* \* \* \* \*